US006005392A

United States Patent [19]
Patzwaldt

[11] Patent Number: 6,005,392
[45] Date of Patent: Dec. 21, 1999

[54] METHOD FOR THE OPERATION AND FOR THE EVALUATION OF SIGNALS FROM AN EDDY CURRENT PROBE AND DEVICE FOR PERFORMING THE METHOD

[75] Inventor: Wolfgang Patzwaldt, Reutlingen, Germany

[73] Assignee: Institut Dr. Friedrich Foerster Pruefgeraetebau GmbH & Co. KG, Reutlingen, Germany

[21] Appl. No.: 08/978,314

[22] Filed: Nov. 25, 1997

[30] Foreign Application Priority Data

Nov. 26, 1996 [DE] Germany ............................ 196 48 834

[51] Int. Cl.[6] .............................. G01V 3/11; G01V 3/165
[52] U.S. Cl. ........................... 324/329; 324/232; 324/233
[58] Field of Search ..................................... 324/329, 335, 324/232, 233, 239

[56] References Cited

U.S. PATENT DOCUMENTS

| 4,563,644 | 1/1986 | Lenander et al. |
|---|---|---|
| 4,942,360 | 7/1990 | Candy . |
| 5,642,050 | 6/1997 | Shoemaker ............................... 324/329 |
| 5,654,638 | 8/1997 | Shoemaker ............................... 324/329 |

FOREIGN PATENT DOCUMENTS

| 31 51 523 | 12/1981 | Germany . |
|---|---|---|
| 42 00 518 | 7/1993 | Germany . |
| 44 23 623 | 1/1996 | Germany . |
| 44 36 078 | 4/1996 | Germany . |
| 2 004 069 | 3/1979 | United Kingdom . |
| WO 87/04801 | 8/1987 | WIPO . |

*Primary Examiner*—Gerard Strecker
*Attorney, Agent, or Firm*—Alston & Bird LLP

[57] ABSTRACT

A method for the operation and for the evaluation of signals of an eddy current probe wherein a transmitting coil is supplied with alternating current with preferably three frequency components. The receiving coil signal corresponding to an a.c. voltage is broken down into corresponding frequency components and by phase-control rectification projection signals are formed corresponding to a real part or an imaginary part of the coil signal. From at least two, optionally individually amplified projection signals of the same type (real or imaginary signal) differential signals are formed. Finally, by the combination of at least two differential signals a combination signal is formed and evaluated. In particular, quotients and amount or value sums of differential signals are formed. The method offers decisive advantages in seeking mines in connection with the suppression of disturbing ground or soil signals and in the identification and classification of mines on the basis of signals from an eddy current probe. The method also makes it possible to use an eddy current probe as the ground probe.

25 Claims, 2 Drawing Sheets

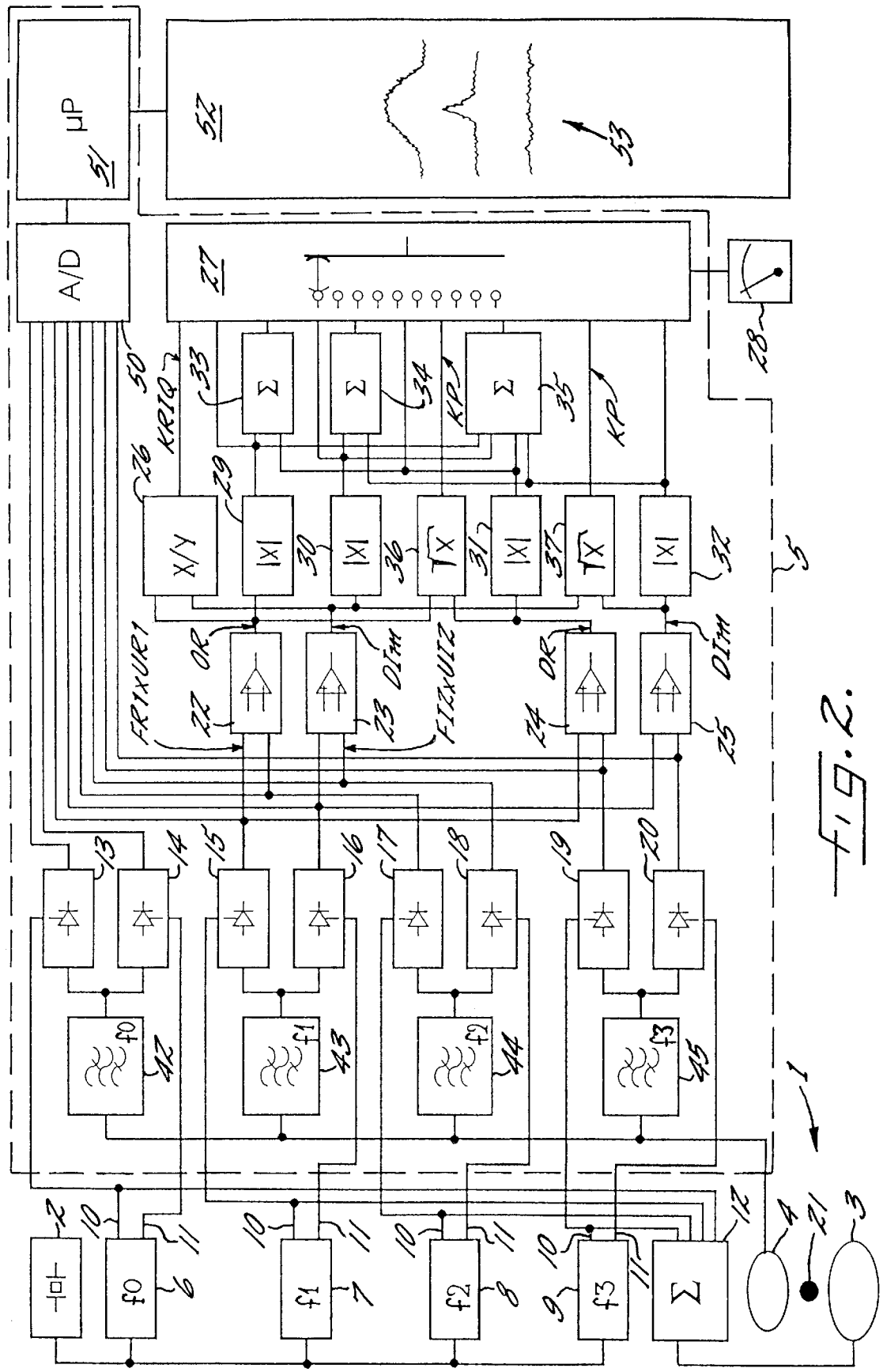

METHOD FOR THE OPERATION AND FOR THE EVALUATION OF SIGNALS FROM AN EDDY CURRENT PROBE AND DEVICE FOR PERFORMING THE METHOD

TECHNICAL FIELD

The invention relates to a method for operating and for the evaluation of signals from an eddy current probe and to a device for performing the method. The preferred field of application is metal and mine detection, in which metal search objects concealed in the ground or search objects having metal parts can be found.

DESCRIPTION OF THE BACKGROUND ART

Metal detection by eddy current probes has long been known in connection with the search for mines. A search coil system of an eddy current probe, which has a transmitting coil connected to an alternating current source and at least one receiving coil, is moved over the ground in the vicinity thereof. On approaching a piece of metal in or on the ground, eddy currents are induced in the metal by the electromagnetic alternating field of the transmitting coil, which act by mutual induction on the receiving coil and there produce a coil signal corresponding to an a.c. voltage. This is supplied to a signal evaluating device and evaluated. A following display or indicating means can optically and/or acoustically indicate or display the presence of a metal piece in the vicinity of the search coil system. The search area can then be more precisely investigated for the presence of a mine.

In practice, considerable difficulties arise when seeking mines, e.g. due to the fact that the search objects are hidden in magnetizable and/or electrically conductive soils, whose conductivity may be further increased by salt water. The soil or ground material can produce disturbance variables as a result of its characteristics which can be up to 500 times greater than the wanted signal caused by a metal piece.

Special operating and evaluating methods have been developed with which it is possible to suppress such unwanted signals. Examples of methods for suppressing unwanted signals in the case of metal detection in disturbing environments are described in international patent application WO 87/04801 and Swedish specification 82 02 094-2 and U.S. Pat. No. 4,563,644 which claims priority from the referenced Swedish specification. The basic "two-frequency method", in which the transmitting coil is excited with two discrete frequencies, is described in conjunction with FIG. 1.

Whilst the two-frequency method yields good results if the environment is exclusively magnetizable or substantially only electrically conductive, but not magnetizable, the case frequently occurs in practice where a soil is both magnetizable and also electrically conductive, in which case limits are encountered in the capacity to suppress ground or soil signals.

In addition, hitherto it has not been possible to gather from the coil signal information as to the nature of the metal involved, the size of the metal piece and the depth which it is buried in the ground.

Another major difficulty in connection with seeking mines by eddy current probes is the false alarm rate. In a search area where mines are assumed to exist, there are also frequency harmless metal objects distributed over or in the ground such as fragments, projectiles, cartridge cases, nails, crown corks, etc. Each of these metal articles can give rise to a search signal in the eddy current probe, without it being possible to decide whether the signal is attributable to a harmless object or a mine. This is particularly problematical in seeking plastic mines which, apart from a plastic body filled with explosive explosive only have a few, small metal parts. These can on the one hand only be detected with sensitive eddy current probes, but on the other, due to their small volume, produce similar signals to those of said small harmless metal objects. In order to obviate a hazard by plastic mines, it has hitherto been necessary when a metal signal occurs to investigate the search area more accurately and optionally manually for the presence of a plastic mine. This greatly slows down the search for mines and therefore reduces the effectiveness of the search.

An object of the invention is to provide a method for the operation of an eddy current probe and for the evaluation of the coil signals, which obviates the aforementioned disadvantages. It is in particular to be possible to carry out an identification of metal pieces, e.g. according to the nature of the metal. Preferably also the effectiveness of the mine search in the presence of plastic mines is to be increased:

SUMMARY OF THE INVENTION

According to the invention this problem is solved by a method for the operation and for the evaluation of signals from an eddy current probe which has a search coil system comprising a transmitting coil connected to an alternating current source which supplies the frequency coil with a plurality of frequency components, and a receiving coil which is connected to a signal evaluating device. The coil signal from the receiving coil is split up into corresponding frequency components. Projection signals are formed corresponding to a real part or an imaginary part of the coil signal, and the projection signals may be amplified to form weighted projection signals. Differential signals are formed which comprise a difference between the weighted projection signals of the same type (real or imaginary). Finally, by a combination of at least two differential signals a combination signal is formed and evaluated.

Whereas in the prior art, two-frequency methods, as a function of the characteristics of the environment, use is made of an imaginary differential signal DIm or a real differential signal DR, as desired, for further processing and evaluation purposes, the present invention teaches that the sought advantages can be obtained if by the combination of at least two differential signals of the DIm or DR type, a combination signal differing from a simple linear combination is formed and is used for further processing and evaluation. As a function of the method used for forming the combination signal and depending on how said signal formation is embodied in an analog or digital circuit, specific advantages are obtained. In addition, reference is made to a device for implementing the advantages of the method.

Features of the invention and advantageous further developments can be gathered from the claims, description and drawings and the individual features, both singly and in the form of subcombinations, can be implemented in an embodiment of the invention or in other fields and can represent advantageous embodiments.

BRIEF DESCRIPTION OF THE DRAWINGS

An embodiment of the invention is described hereinafter relative to the drawings, wherein show:

FIG. 2 A block diagram of a preferred embodiment of a device according to the invention.

DETAILED DESCRIPTION OF THE PREFERRED EMBODIMENT

Figure 1:
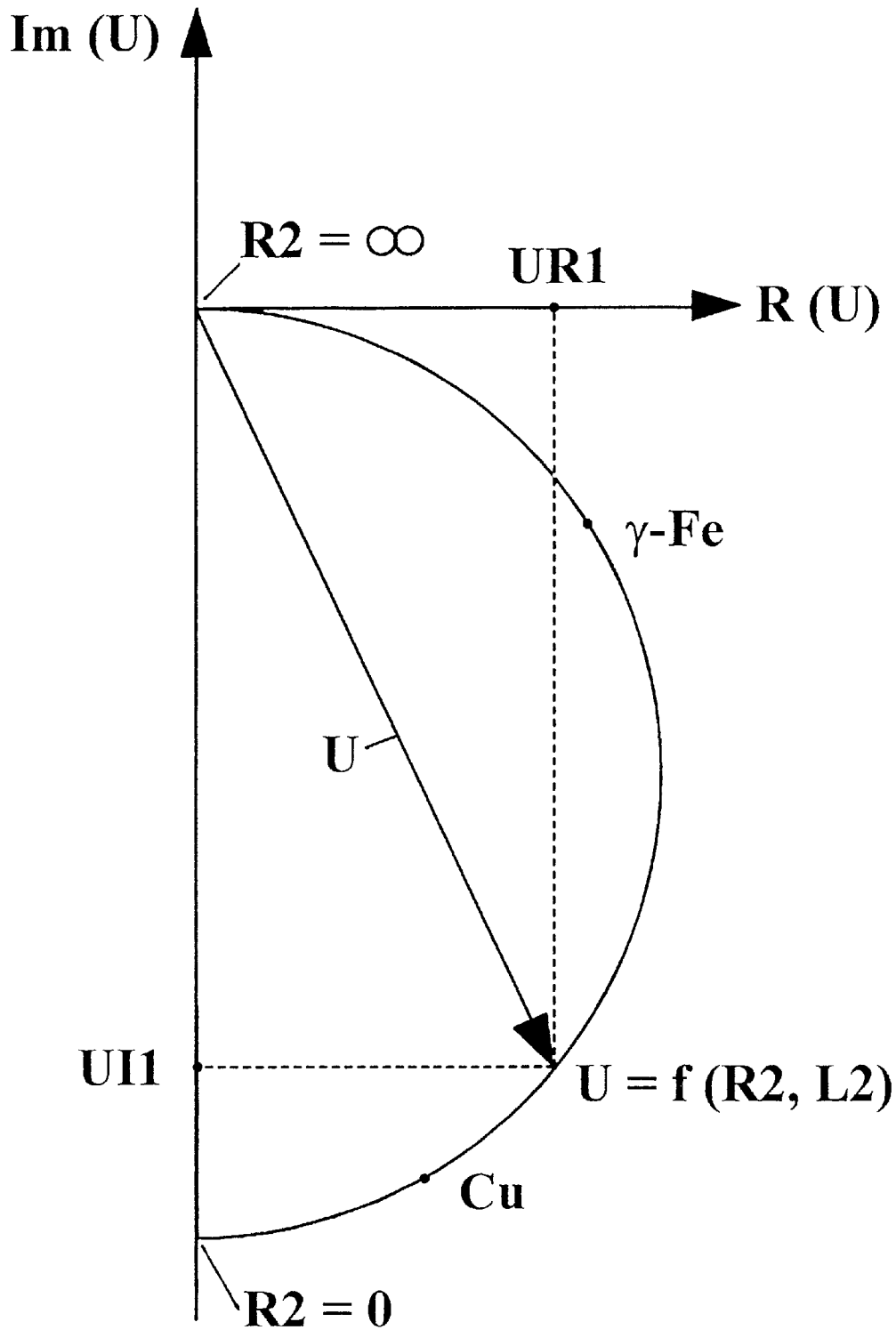
FIG. 1 A diagram with a vector corresponding to an a.c. voltage U in a complex voltage plane with a real axis R (U) and an imaginary axis Im (U).

In order to illustrate the invention firstly the bases of metal detection are described with the aid of the eddy current principle, accompanied by terms essential for the understanding of the invention. Hereinafter, without restriction to metal, the material metal stands for electrically conductive search objects in general. However, the preferred technical field is metal detection, particularly seeking mines.

On considering a piece of metal, in whose vicinity is brought a search coil system of an eddy current probe in such a way that an electromagnetic alternating field emanating from the transmitting coil induces in the metal piece an eddy current, which in turn brings about an electromagnetic alternating field, the latter acts back by mutual induction on the receiving coil of the search coil system. The metal piece is symbolized by a conductor loop, which has a self-inductance L2 and a resistance R2 and through which flows eddy current of intensity I2. Through the transmitting coil flows a primary current I1 and the transmitting coil has an inductance L1. The receiving coil has the inductance L3. L12 and L23 are the mutual induction coefficients, which describe the magnetic coupling between the transmitting coil and the metal piece or between the metal piece and the receiving coil. The a.c. voltage U is then the voltage induced by I2 * L23. The angular frequency of the primary current is represented by the symbol f. f1 stands for a discrete, first frequency and f2 for a discrete, second frequency differing from the first frequency and which differs from the latter by a preferably integral factor FF unequal to 1.

Further abbreviations used in the present application are e.g. UR1 for the real part, UI1 for the imaginary part of the a.c. voltage U of frequency f1, FR1 a multiplication factor for the real part UR1, FI1 a multiplication factor for the imaginary part UI1 and the factors can be equal to or different from 1. Corresponding symbols UI2, UI3, etc. stand for corresponding signals of the second, third, frequency etc. GI is a factor dependent on the search situation with GI=(L12*L23)/L2, V21 is the frequency ratio f2/f1 and I11 or I12 are the amplitudes of the primary current components of the first and second frequencies.

In the complex voltage diagram of FIG. 1, the complex drawing plane is spanned by the real axis R (U) and the imaginary axis Im (U) at right angles thereto. The a.c. voltage U occurring in the receiving coil is represented by the vector U, which is turned by an angle with respect to the real axis. The position of the vector U is a function of the material parameters R2 and L2 of the metal piece. The angle represents the position of the electrical conductivity of the material of the metal piece on the so-called eddy current locus diagram U=f(R2, L2). Poor conductors, such as e.g. non-magnetic, austenitic iron (gamma-Fe), are in the upper region of the semicircle, whereas good conductors, such as e.g. copper are in the lower region.

It can be gathered from FIG. 1 that the real part UR1 and imaginary parts UI1 correspond to projections of the voltage U on the real or imaginary axis. In practice, the projection signals UR1 and UI1, in analog processes, can be formed e.g. by phase-controlled rectification of the voltage U relative to the primary current I1. Thus, the projection signals UR1 and UI1 are available as measured values, as are UR2, UI2, etc.

In the case of a search object in electrically and magnetically inactive environments, by ratio formation of said measured values the electrical conductivity of the search object can be determined. In practice, e.g. when searching for mines and the like, considerable difficulties are encountered through magnetizable and/or electrically conductive soils, in which the search objects to be detected are hidden. Salt water as a conductive medium also frequently occurs as a disturbance variable. In order to suppress the disturbance variable, the phase for the controlled rectification can be set at right angles to the disturbance variable, so that the voltage U is projected onto the axis perpendicular to the disturbance variable. Voltages caused by magnetizable soil, are substantially in the direction of the imaginary axis and to suppress this influence projection normally takes place onto the real axis. Although compared with metals the conductivity of soil and salt water is very small, but due to the large volume considerable voltages still arise. They are ideally substantially in the direct of the real axis. Thus, for suppressing them projection can take place onto the imaginary axis and only measuring signals in this direction are evaluated.

This type of interference or disturbance suppression can be adequate if magnetizable and/or conductive soil and/or salt water are simultaneously present, which is normally the case. With metal detectors only operating with a single frequency, an attempt can be made, e.g. with the aid of a phase shifter to evaluate perpendicular to the voltage vector of the main disturbance source. As however, soil or ground influences generally fluctuate greatly, this requires a constant resetting of the phase, which is generally performed manually and requires much skill and experience on the part of the operator. Therefore the searching speed is greatly reduced.

The conventional two-frequency method partly avoids these problems. In two-frequency methods a primary alternating current I1 is supplied to the transmitting coil and contains a component of a discreet, first frequency f1 and a component of a discreet, second frequency f2. In the receiving coil a voltage is formed with two frequency components with which are in each case associated according to FIG. 1 a real part and an imaginary part. For example, for the imaginary part of the voltage of the first frequency, the following value is obtained:

$$UI1 = f1 * I11 * GI * 1/(R2/f1 * L2)^2 + 1 \qquad (Eq.\ 1)$$

This equation 1 contains as the unknown the factor GI and the values R2 and L2. The following abbreviation applies: $(R2/(f1*L2))^2 = S$. With magnetizable soil, for each of the two frequencies there is an additional voltage component UF1 or UF2.

The voltages corresponding to the frequencies f1 and f2 can be obtained if the coil signal of the receiving coil is subdivided into frequency components corresponding to these frequencies. For this purpose a signal evaluating device can e.g. have band-passes of centre frequencies f1 and f2. The subdivision can optionally take place following the amplification of the receiving coil signal. Through the projection of the two frequency components, the corresponding real and imaginary signals can be produced, so that in all there are four signals or four channels with the voltages UR1, UI1, UR2 and UI2. They can be multiplied with the corresponding factors FR1, FI1, FR2 and FI2, which in the case of analog evaluation corresponds to an amplification or attenuation of the corresponding voltages. One or more factors can also be equal to 1, so that a multiplication stage does not modify the corresponding signals. In these cases projection signals and weighted projection signals are identical. The multiplication stage of the method is then omitted.

The voltages or signals generally contain both signal fractions of the search object and also signals of the optionally magnetizable and/or electrically conductive environment. For the suppression of spurious signals due to a magnetizable environment, the voltages of the imaginary channels corresponding to the frequencies are fed to a subtracter. If through the correct choice of the weighting factors FI1 and FI2 in the case of known values of f1, f2, I11, I12, the following condition is set:

$$FI1*f1*I11=FI2*f2*I12=G \quad (Eq.\ 2)$$

then through said subtraction the influence of the magnetizable soil can be reduced to zero. Thus, according to this method a signal is formed, which corresponds to the difference of the eddy current effects in an electrically conductive search object at different frequencies. The imaginary differential signal DIm is a differential signal from weighted projection signals formed by projection onto the imaginary axis and can be represented as follows:

$$DIm=(FI2*UI2)-(FI1*UI1)$$

$$=GI*G*[1/(S+1)-(V21)^2/(S+(V21)^2)] \quad (Eq.\ 3)$$

The factor V21 stands for the frequency ratio f2/f1. The wanted/spurious signal ratio rises sharply, because through said subtraction the main disturbance sources are simultaneously suppressed, because the signal DIm is evaluated in the direction of the imaginary axis and the conductivity components in the direction of the real axis are suppressed. Through a corresponding method stage a real differential signal DR can be formed according to the following equation:

$$DR=(UR2*FR2)-(UR1*FR1) \quad (Eq.\ 4)$$

The use of differential signals DIm or DR can be adequate, if it is only wished to suppress disturbing ground signals. Hitherto known methods utilize these effects.

However, e.g. with respect to the conductivity of the search object material, the signals are ambiguous, so that different materials can give the same signals DIm or DR.

A significant improvement with respect to disturbance suppression and/or identifiability of a search object in or close to the ground is obtained if, through the combination of at least two differential signals of the DIm or DR type, a combination signal is formed and used for evaluation. The combination signal advantageously differs from a simple linear combination of the differential signals.

Thus, e.g. both an imaginary differential signal DIm and a real differential signal DR can be formed and are combined in such a way that the combination signal is a real-imaginary combination signal KRIS, which is formed by summation of the amounts or values of the differential signals according to $$KRIS=|DIm|+|DR| \quad (Eq.\ 5)$$

In this way an even better wanted/spurious signal ratio can be obtained than in the hitherto known, separate evaluation of the signals DIm or DR. Value or amount formation is advantageous, because e.g. in the case of rising frequency the voltage UR can both increase, as is e.g. the case with gamma-iron, and also decrease, such as e.g. the case with copper. Thus, both signs of the difference DR, i.e., negative and positive differences, are possible. Through amount or value formation at least with respect to DR, a possible sum signal reduction is avoided.

A further significant rise in the information content made possible by the method can be achieved in that an imaginary differential signal DIm and a real differential signal DR are formed and that the combination signal is a real-imaginary combination signal KRIQ, which is formed by the quotient of the differential signals according to equation $$KRIQ=DIm/DR \quad (Eq.\ 6)$$

or the reciprocal value thereof. This is inter alia of decisive importance because the individual differential signals DIm or DR do not permit a conductivity determination. Thus, the corresponding individual signals contain too many unknowns, e.g. factors GI dependent on the mutual inductances L12 and L23, as well as the self-inductance L2. Through a division of the differential signals and the formation of a combination signal of the KRIS type, it is possible to form a signal proportional to the conductivity of the search object material, which obeys the following equation with respect to the frequency f1:

$$L2/R2=FI1/(f1*FR1)*(DR/DIm) \quad (Eq.\ 7)$$

All factors on the right side of equation 7 are known. On the basis of equation 7 it is possible to produce a non-ambiguous signal for the conductivity of the material found, if a search system based on the eddy current principle is used. The equation can be used by implementing the function shown in equation 7 or a corresponding function using an analog circuit or digitally, e.g., with the aid of a correspondingly constructed micro-processor. This permits a classification of metals according to their conductivity. With the aid of a corresponding association or assignment table stored in a search device, it is possible to directly display on an output unit, e.g. an optical display (LED, LCD display or the like) what type of metal has been found.

The described methods implementable with two exciting frequencies are advantageous, but e.g. in searching for mines environmental conditions can arise in which the disturbance signals caused by the conductive and/or magnetizable soil are so high that either only imaginary differential signals of the DIm type or real differential signals of the DR type can be used for metal detection. A determination of the conductivity by division according to equation 7 is then only inadequate or impossible.

The difficulties can be eliminated by adding at least one further frequency component of the exciting current or primary current according to at least one further discreet frequency f3, which differs by a factor FF13 from the first frequency f1 and by a factor FF23 from the second frequency f2, FF13 and FF23 preferably being integral and unequal to 1. As in the already described methods, by subdivision or splitting up into frequency components and the formation of projection signals, also with respect to the third frequency it is e.g. possible to form a third real signal UI3 or a third imaginary signal UR3. These are the projection signals which are associated with the third frequency. In accordance with what has been stated hereinbefore, a projection signal can be multiplied by a multiplication or amplification factor FI3 or FR3, so that a weighted projection signal P3 is formed, which either corresponds to the projection on the real axis according to P3=(FR3*UR3), or the projection on the imaginary axis according to P3=(FI3*UI3). For further processing advantageously either weighted projection signals P1, P2, P3 are used, which all correspond to a real signal, or which all correspond to an imaginary signal. From the weighted projection signals P1, P2, P3 of a common type (real or imaginary signal), it is then possible to form e.g. a first projection differential signal DP21 according to equation $$DP21=P2-P1 \quad (Eq.\ 8)$$

and at least one second projection differential signal, e.g. DP31 according to $$DP31 = P3 - P1 \tag{Eq. 9}$$

With the aid of the at least one additional third frequency, it is consequently possible with respect to one component (real or imaginary component) to in each case form two or three or even more projection differential signals.

Without limiting its general applicability, the method is described hereinafter relative to a three-frequency method. It will be clear to the expert that it is also possible to use a fourth, fifth and further frequencies, so that a correspondingly higher number of projection differential signals can be produced.

According to the three-frequency method, e.g. two different signals of the DIm type or two different signals of the DR type can be produced, which can correspond to two DIm or DR channels. Both channels of one type can e.g. be used in the above-described manner individually for metal detection and/or metal identification and e.g. the channel with the better wanted/spurious signal ratio can be used for further evaluation.

It is particularly advantageous if a projection combination signal KP is formed, which is formed by the combination of at least two of the aforementioned projection differential signals of type DP21, DP31, etc. This combination can be performed in analog and/or digital manner in the signal evaluating device. If the projection combination signal KP is formed from the quotient of two projection differential signals, e.g. according to $$KP = DP31/DP21 \tag{Eq. 10}$$

then from the combination signal it is possible to draw a clear conclusion regarding the conductivity of the corresponding material, because it is possible to eliminate the unknown mutual inductances L12 and L23 and the self-inductance L2.

Unlike in the conductivity determination according to equation 7, with the multifrequency method with more than two frequencies advantageously a choice is possible between an evaluation in the imaginary direction and an evaluation in the real direction, so that during evaluation it is possible to choose the direction which permits a better disturbance suppression. With the abbreviation: V31=F3/F1 and KP=DP31/DP21 the ratio (L2:R2) proportional to the electrical conductivity of the search object can be obtained from the following equation $$L2/R2 = 1/f1 * [(KP*(1-V31^2)-(1-V21^2))/(V31^{2}*(1-V21^2)-KP*V21^{2}*(1-V31^2))]^{1/2} \tag{Eq. 11}$$

According to this equation evaluation takes place in the direction of the imaginary axis, which is advantageously used if the spurious signals are smaller in the imaginary axis direction than in the real axis direction.

An identical evaluation for conductivity determination occurs with evaluation in the real axis direction, the latter evaluation method being advantageously used if the spurious signals are smaller in the real axis direction than in the imaginary axis direction.

The thus determined conductivities can be compared, e.g. by means of a comparison element, with conductivity values according to equation 7, so as to obtain information on the reliability of the determined values.

A projection combination signal KP can also be formed by summating the amounts or values by means of at least two projection differential signals, e.g. according to $$KP = |DP31| + |DP21| + \tag{Eq. 12}$$

in a summating element of an analog circuit or a microprocessor, etc. The signals DP31, DP21, etc. can correspond in each case to differences of projection signals on the imaginary or real axis. In the case of differences relative to the real axis, as stated hereinbefore, value formations are advantageous. It is also possible to summate signals of the imaginary axis and signals of the real axis.

It has hitherto been described that in particular the three-frequency or multifrequency methods, unlike in the case of two-frequency methods, make it possible to determine the conductivity of a located metal part. This can be achieved in the case of optimum suppression of ground signals.

If the material of the search object is not only electrically conductive, but also ferromagnetic, a similar semicircular eddy current locus diagram V=f(R2, L2) to that of FIG. 1 is obtained. This coincides on the imaginary axis at R=0 with the eddy current locus diagram U=f(R2, L2) shown in FIG. 1, but has a diameter larger by an amount Q, so that the other intersection with the imaginary axis is at +Q. Q is only dependent on the permeability of the material. With ferromagnetic, metallic materials the angle between the real axis and the vector represents the product of permeability and electrical conductivity.

This fact is advantageously taken into account if at least one and preferably two components of the primary current I1 have a low frequency f0, which is lower than 1 KHz, preferably between 50 and 500 Hz and is in particular at approximately 100 Hz. The primary coil can also be supplied in time-staggered manner to the primary current I1 with alternating current of frequency f0. This supply with frequency f0 preferably takes place over a limited time interval. The coil signal then contains a corresponding component, which corresponds to a low frequency signal obtained through the low frequency. With low frequencies the signal components brought about by eddy currents in the search object can be ignored compared with the signal components caused by ferromagnetic effects. With frequencies of approximately 100 Hz on the one hand the signal components generated by the eddy currents are still sufficiently small, and on the other hand said frequencies are sufficient to rapidly remagnetize ferromagnetic material in such a way that the resulting voltage induced in L2 is sufficiently high. Through the use of low frequencies the factor Q can be determined and a Q-signal corresponding to this factor can be formed.

If there are no magnetic disturbance sources, a single low frequency f0 can be sufficient. The amount of the imaginary voltage induced by it UI0 is substantially equal to Q, if f0 is sufficiently low that eddy current effects on the imaginary part UI0 are negligible. The transformation of the eddy current locus diagrams V=f(R2, L2) and U=f(R2, L2) with the aid of the Q-signal, which can also be called a transformation signal, can take place according to the generally known rules of the transformation of circles. This can take place in analog manner, e.g. by the subtraction of voltages, or in digital manner, e.g. in a microprocessor.

If magnetic disturbance sources are present, preferably use is made of two different low frequencies and in analogy to equation 3 an imaginary differential signal DIm0 can be formed. Disturbance influences by magnetizable disturbance sources are consequently suppressed. It is also possible to use the real parts of the voltages induced by the two low frequencies for suppressing conductive soils and salt water and for forming the Q-signal.

By means of the Q-signal or transformation signal, it is possible to carry out a transformation of the coil signal with a "ferromagnetic" signal component brought about by the magnetizability of the search object into a transformed coil signal without said component. The further evaluation of the transformed coil signal can be performed as described hereinbefore and hereinafter. The determined permeability can be indicated as a measured value in analog and/or digital manner. By means of corresponding assignment tables, the metal type can be directly indicated. This information can be compared with the conductivity information, which avoids possible ambiguities.

With the aid of the here proposed method stages, a hitherto unimplemented possibility is made available of using an eddy current probe as a probe specifically directed at ground signals. This can be of great advantage e.g. when seeking mines, when plastic mines are involved which, apart from a plastic body or casing, generally only have very small metallic parts, e.g. igniters, etc. If an eddy current probe is used as the ground probe for producing a ground signal, this finding can be utilized to the effect that no soil material can be present there where a plastic body is located in the soil. If a metallic part is discovered and a ground probe establishes that a volume area surrounding the metal part has no ground material and no electrically conductive material, it can be assumed that it is filled with electrically non-conductive material, especially plastic. A ground material-free "excavation", i.e. the lack of ground material, particularly in a defined spatial relationship to the location of a metal part, can consequently be utilized as indicating the presence of a plastic mine.

Using the example of an evaluation in the direction of the imaginary axis, which is preferably used in the case of magnetizable soil, the method for producing a ground signal by means of an eddy current probe can be represented and implemented as follows. In order to form the ground signal without a signal of a possibly present metal part, it is appropriate if initially the metal part signal is removed from the overall signal in the imaginary direction. This is generally advantageous, because the plastic casing of the plastic mine surrounds the metal part or is adjacent thereto and the ground signal and the metal signal occur both at the same time and in essentially the same place. According to the present method for eliminating a probe signal component corresponding to the metal object the conductivity of the object can be determined, e.g. according to equation 7, so that a signal can be produced, which corresponds to the factor $(L2/R2)$ proportional to the conductivity. On the basis of a signal corresponding to the factor $(L2/R2)$, the still unknown factor $GI$, which results from the mutual inductances $L12$ and $L23$, as well as the self-inductance $L2$ of the metal piece is determined and a corresponding signal formed. Mathematically the formation of the signal corresponding to the factor $GI$ is obtained e.g. by introducing equation 7 into equation 3, giving:

$$GI = DIm/(G*(1/(S+1) - V21^2)/(S+V21^2))$$ (Eq. 13)

This factor not determinable with any of the hitherto known methods and which in the signal evaluating device corresponds to a corresponding analog or digital signal, makes it possible from an overall signal U considered in the imaginary axis direction, to determine the imaginary part of the voltage produced by the metal part for one frequency. This imaginary part e.g. corresponds for the first frequency f1 to the voltage UI1, as represented in equation 1. Thus, as a result of the described method, all the factors occurring in equation 1 are known. Signal formation can be mathematically described as follows:

$$FI1*UI1 = GI*G*(1/(S+1))$$ (Eq. 14)

The signal FI1*UI1 corresponds for the frequency f1 to the imaginary part of the coil signal, weighted by the factor FI1, produced by the metal part at frequency f1. By multiplication with a frequency-specific factor C, which can e.g. have a value C1, preferably between 0.9 and 1.1, the signal can be weighted for precision adjustment purposes. The weighted, projected metal signal can then be subtracted from the overall signal present in the imaginary channel of the frequency f1. By subtraction a ground signal UBI1 is obtained, which for the frequency f1 corresponds to a ground signal UB projected in the imaginary axis direction.

Corresponding signals can be formed for all the frequencies used in each case for the imaginary axis and for the real axis and used for evaluation purposes.

With the aid of the described ground signal, a suspicious search area where a plastic mine is assumed to be present, can be investigated by the reciprocating movement of the eddy current probe over the suspected location and observation of the signal path of UBI1, e.g. in the form of an "overflow curve". This can be carried out optically, e.g. with the aid of an indicator, display or light emitting diodes, or also acoustically and preferably the minima or maxima of the signal path are observed and can optionally be stressed by corresponding components of the signal evaluating device. If it is already known from the conductivity determination, that the suspicious location contains metal and does not merely represent a ground inhomogeneity, a correlation of the ground signal UB with the metal signal can be carried out, e.g. by comparison of the spatial positions of the extremes of the overflow curves. The overflow curves can advantageously be drawn in, optionally after digitization, in their time and/or place path. By means of an indicating means, e.g. a screen, the overflow curves of the metal part and the ground can be represented in time-staggered or, preferably, simultaneous manner. If the extreme values of both curves are set to equal values by a suitable amplification or attenuation (corresponding to a multiplication with weighting factors), it is possible, e.g. by comparison of the half-widths, to establish whether in fact a metal part is surrounded by plastic or a soil-free volume area, or whether the assumed ground signal merely constitutes an inadequately compensated component of a metal signal. As the volume of a plastic body, e.g. a plastic mine, is generally larger than that of the metal part, the half-width of the ground signal is greater than that of the metal signal. By varying the factor C1 the overcoupling of the metal signal to the ground signal can be minimized, because if there is no soil-free excavation, the overflow curve of the ground signal disappears almost completely at a given value of C1. However, if there is an excavation indicating a plastic mine, then a characteristic "residual curve" remains. If the associated extremes of the two curves are laterally mutually displaced, this indicates that the metal part, e.g. an igniter, and the plastic body of the plastic mine are laterally interconnected.

As stated, a ground signal can also be formed with respect to a further frequency, e.g. frequency f2 corresponding to UBI2. By comparison of the overflow curves determined for two or more frequencies, in particular by comparison of the "residual curves" the frequency-specific signal with the better wanted/spurious signal ratio can be selected.

It is also possible to form the sum of the ground signals of at least two frequencies with respect to a projection axis, e.g. the imaginary axis and use this for evaluation purposes. As a function of the conductivity, permeability and geometrical shape of the metal part it is possible to minimize the overcoupling of metal signals at the different frequencies by varying the factors, e.g. factor C1 and C2.

The method hitherto described in exemplified manner for the production and evaluation of a ground signal relative to the imaginary axis is particularly advantageous if the ground or soil is magnetizable. If the ground or soil is particularly conductive, then corresponding ground or soil signals UBR1, UBR2, etc. can be formed in the same way by projection onto the real axis.

As eddy currents in conductive soils rise quadratically with the frequency f, in the case of conductive soils preference is given to very high frequencies for accentuating the ground signal. At least one frequency can be e.g. more than 60 KHz, particularly more than 100 KHz and preferably about 100 KHz, but should preferably be less than 200 KHz. When using three or more frequencies there can be a frequency staggering by an integral multiple of two producible by frequency division of a fundamental frequency and which is in particular by a factor of 8. E.g. f1=2 KHz, f2=16 KHz and f3=128 KHz.

For improving the wanted/spurious signal ratio, it is possible to add two or more ground signals and preferably in the case of ground signals UBR1, UBR2, etc., which result from evaluation in the real axis direction, the amounts or values are used for summation.

The described ground signal formation and evaluation can be performed with two frequencies, but advantageously with three or more frequencies. If e.g. for conductivity determination only signals or data for one axial direction are evaluated, spurious signals in the other axis can be particularly well suppressed. Through the compensation of any errors occurring in the individual channels, the wanted/spurious signal ratio can be improved on forming the sums.

Particularly great advantages can be obtained through a formation and evaluation of signals representing the frequency dependence of ground signals—conductive soils and salt water having a quadratic dependence, whereas magnetizable soils have a linear dependence on the frequency. The frequency dependence of metal signals is fundamentally different. By evaluating the frequency dependence of a signal parasitically overcoupled signals can be identified and separated from wanted signals. In particular, the cross-talk of ground signals and metal signals can be taken into account and eliminated for the evaluation.

The production or formation of the described signals, which for better illustration purposes are symbolized as factors in mathematical equations, can take place both with analog, electronic components and at least partly digitally, e.g. with the aid of a microprocessor.

The block circuit diagram of FIG. 2 illustrates how in the case of a ground identification and foreign body detection device in the form of a mine searching device the eddy current probe and signal evaluating device and their components can be advantageously interconnected. The continuous lines in each case represent electrically conductive connections, whereas crossing lines are only electrically interconnected at the crossings marked with block dots.

The search coil system 1 of the eddy current probe has a transmitting or primary coil 3 connected to an alternating current source 2 and a receiving coil 4, which is connected to a broken line framed signal evaluating device 5. The source 2 produces a primary current of a given frequency. By means of frequency dividers 6, 7, 8, 9 it is so subdivided that e.g. the frequency divider 7 produces the frequency f1 with 2 kHz, frequency divider 8 the frequency f2 with 16 KHz and the frequency divider 9 the frequency f3 with 128 KHz. Frequency divider 6 produces the low frequency f0 of 100 Hz. At the upper output 10 each frequency divider produces a real reference signal and at the lower output 11 an imaginary reference signal phase-shifted with respect thereto by 90°.

The real reference signals are combined by means of a summating device 12 with a primary current containing components of the frequencies f0, f1, f2 and f3, which is supplied to the transmitting coil 3. The real reference signals or imaginary reference signals are fed to inputs of phase-controlled rectifiers 13 to 20, the rectifiers 13, 15, 17, 19 being controlled in phase with the primary current and recitifiers 14, 16, 18, 20 phase-shifted by 90° with respect to the primary current. The projection signal forming means 13 to 20 constructed as phase-controlled rectifiers are used for the projection of the signal voltage U at the receiving coil 4 to the real axis (rectifiers 13, 15, 17, 19) or to the imaginary axis (rectifiers 14, 16, 18, 20).

The primary coil 3 and receiving coil 4 are positioned close to a metal search object 21. By mutual induction in the receiving coil 4 is produced a signal voltage U, which is applied to the inputs of band-passes 42 to 45. For example, band pass 43 has a centre frequency f1, so that essentially only signals of this frequency can pass through the band-pass to the rectifiers 15, 16. The same applies for the band-passes 42, 44, 45 with the corresponding frequencies f0, f2 and f3. The band-passes 42 to 45 also have amplification elements with which the primary voltage U is amplified. The band-passes bring about a splitting up of the coil signal of the receiving coil into corresponding frequency components and are also therefore referred to as frequency splitting means. At the output of the band-pass 43 transmissive for the frequency f1 is consequently present the component of the optionally amplified coil signal U corresponding to the frequency f1. This component is applied to the inputs of the control rectifiers 15, 16. At the output of the rectifier 15 is consequently present the projection signal UR1, which in the case of corresponding amplification gives a weighted projection signal FR1*UR1. The individual amplification of the projection signals with the factors FR1, FI1, etc. takes place in amplification stages, which in FIG. 2 are integrated into the rectifier units 13 to 20. Correspondingly, e.g. at the output of the rectifier 16 for the imaginary part the signal FI1*UI1 is present. The same applies for the outputs of the other rectifiers 13, 14 and 17 to 22. The output signal of rectifier 18 is e.g. FI2*UI2. Thus, weighted projection signals are applied to the outputs of the rectifiers 13 to 20.

In the subtracters 22, 23 following the rectifiers 15 to 18 the differential signals are formed in accordance with equations 3 and 4, namely in subtracter 22 the real differential signal DR and in subtracter 23 the imaginary differential signal DIm. These relate to differences with respect to the frequencies f1 and f2. Thus, in subtracter 24 a signal of type UR3-UR1 and in subtracter 25 a signal of type UI3-UI1 is produced. These signals are formed by subtraction between components of the first and third frequencies. The corresponding gain factors FI and FR are omitted for simplification reasons.

The analog further processing of the differential signals produced by subtracters 22, 23, 24, 25 takes place in electronic functional blocks following the same. For example, the output signal DR of subtracter 22 is applied to one input and the output signal DIm of subtracter 23 to the other input of a dividing element 26, which carries out a corresponding quotient formation DR/DIm, as is necessary for calculating the conductivity of the search object according to equation 7. The output signal KRIQ of the dividing element 26 is supplied to a multiplexer 27 by means of which, when the multiplexer is correspondingly adjusted, it can be displayed by means of an analog display unit 28. The amount or value forming units 29, 30, 31, 32 following the subtracters 22, 23, 24, 25 form from the type DR or DIm differential signals corresponding amount or value signals. From the example of the amount forming element 29, which produces the amount of the output signal DR of subtracter 22, it can be seen that the output signal is supplied both directly to the multiplexer 27 and to the summator 33, whose other input is connected to the output of the amount forming element 31, which forms the amount of the real differential signal of type UR3-UR1 from subtracter 24. The output signal of summator 33 corresponds to the sum of the amounts of two projection differential signals according to equation 12, the differential signals being here of a real signal type. The corresponding sum of amounts of imaginary signals is formed in the summator 34 and supplied by its output to the multiplexer 27. The summator 35 forms the sum of all the output signals of the amount forming elements 29, 30, 31, 32, which is also represented in generalized form in equation 12.

The output signal DR of subtracter 22 is also applied to the input of the arithmetic or computing element 36, to whose other input is applied the differential signal UR3-UR1 of the subtracter 24, which is also of the DR type. The computing element 36 forms a conductivity signal calculated from the quotient of two projection differential signals. A projection combination signal KP is formed, as is e.g. described in equation 10. Both input projection differential signals are of the real signal DR type.

Then, according to equation 11, the conductivity is calculated and a corresponding signal formed. Correspondingly the computer element 37 forms a projection combination signal KP from the quotient of two imaginary signals of type DIm, once again according to equation 10. As can be gathered from equation 11, the computing elements 36, 37 contain a circuit for calculating a root of a value. The output signals of the computing elements 36, 37 are proportional to the conductivity of the search object 21 and in the case of correspondingly constructed displays 28 can be used for directly displaying the metal type. By means of corresponding assignment tables it is optionally also possible to display the mine type. It is possible to obtain an electromagnetic signature of the search object usable for classifying mines.

Hitherto an analog processing of the signals and an analog formation of the combination signal have been described. The combination signal can alternatively or additionally be digitally formed, as will now be described. The output signals of the control rectifiers 13 to 18 are connected in FIG. 2 to corresponding inputs of an analog-digital converter 50, which converts the analog signals into digital signals processable by a microprocessor 51. In the microprocessor 51 it is possible to perform all the above-described signal formation stages following projection and optionally weighting in a digital manner and produce corresponding signals, which can be represented by means of one or more displays 52. The display 52 can have a screen and/or one or more light emitting diode systems, from which an operator can gather corresponding values, e.g. concerning the magnitude of the signals DR, DIm, the sum of the amounts of DR, the sum of the amounts of DIm, the sum of the corresponding amount sums, the conductivity, the permeability, the volume of the metal piece and optionally the volume of a detected excavation in the ground. In addition, the display can e.g. have on a screen overflow curves 53 for metal signals, ground signals and/or residual curves.

As shown, the represented method stages are suitable for supplying signals, which can be processed and optionally recorded in analog and/or digital manner. The recordings of e.g. overflow curves 53 can be subsequently and/or simultaneously displayed for search purposes for an eddy current probe operator, e.g. by the screen 52 or some other optical display. Acoustic indications are also possible. Through the described method, in which it is possible to achieve the optimization of signals by varying multiplication factors, e.g. factors C1, C2, etc., it is e.g. possible in the case of a display on a monitor or the like and the variation of the factors C1, C2, etc. for an operator to interactively set the best wanted/spurious signal ratio. The optimization of the wanted/spurious signal ratio by varying the multiplication or amplification factors can also be automatically achieved by corresponding optimization elements of the analog or digital circuit of the signal evaluating device.

We claim:

1. A method for operating an eddy current probe and for evaluating coil signals from the eddy current probe, the coil signals containing information about a region examined by the eddy current probe, the eddy current probe having a search coil system, which has at least one transmitting coil connected to an alternating current source and at least one receiving coil electrically connected to a signal evaluating device, the receiving coil being adapted to produce the coil signal U corresponding to an a.c. voltage, the method comprising the following steps:

supplying the transmitting coil with a primary alternating current I1, which contains a component of a discrete, first frequency f1 and a component of at least one discrete, second frequency f2, arranging the transmitting coil with respect to the region to be examined such that a signal emitted by the transmitting coil and interacting with the ground is received by the receiving coil to produce the coil signal, transmitting the coil signal to the signal evaluating device, splitting up the coil signal into frequency components corresponding to the first frequency f1 and the at least one second frequency f2, forming a projection signal associated with the first frequency f1 and a projection signal associated with the second frequency f2, a projection signal being a real signal UR1 or UR2 or an imaginary signal UI1 or UI2, multiplying the projection signal with factors FR1, FR2, FI1, FI2 associated in each case with the projection signals for forming weighted projection signals P1=(FI1*UI1) or (FR1*UR1) or P2=(FI2*UI2) or (FR2*UR2), forming at least two differential signals, wherein a differential signal comprises a difference between weighted projection signals of the same type (real or imaginary signal) and wherein a differential signal is either an imaginary differential signal or a real differential signal, the forming of differential signals being performed according to $$DIm=(FI2*UI2)-(FI1*II2)$$

for an imaginary differential signal and $$DR=(FR2*UR2)-(FR1*UR1)$$

for a real differential signal, forming a combination signal differing from a linear combination by the combination of at least two differential signals of type DIm or DR, evaluating the combination signal, the combination signal representing a processed coil signal.

2. The method according to claim 1, wherein an imaginary differential signal DIm and a real differential signal DR are formed and wherein the combination signal is a real-imaginary combination signal KRIS formed from the sum of the amounts of the differential signals according to $$KRIS=|DIm|+|DR|.$$

3. The method according to claim 1, wherein an imaginary differential signal DIm and a real differential signal DR are formed and wherein the combination signal is a real-imaginary combination signal KRIQ, formed from the quotient of the differential signals according to one of the group consisting of $$KRIQ=DIm/DR \text{ and } KRIQ=DR/DIm.$$

4. The method according to claim 1, wherein the alternating current I1 contains a component of at least one discrete, third frequency f3, wherein at least one weighted projection signal p3=(FI3*UI3) or P3=(FR3*UR3) associated with the third frequency is formed, wherein from the difference between two weighted projection signals of type P1, P2, P3 is formed a first projection differential signal and at least one projection differential signal differing therefrom, the weighted projection signals P1, P2, P3 in each case all corresponding to a real signal or all corresponding to an imaginary signal and wherein the combination signal is a projection combination signal KP formed by the combination of at least two projection differential signals.

5. The method according to claim 4, wherein the projection combination signal KP is formed from the quotient of two projection differential signals.

6. The method according to claim 4, wherein the projection combination signal KP is formed by a summation of the amounts of at least two projection differential signals.

7. The method according to claim 1 comprising the following step:
forming a frequency-specific conductivity signal from one of the group consisting of a combination signal KRIQ corresponding to a quotient of differential signals DIm and DR and a combination signal KP corresponding to a quotient of at least two projection differential signals.

8. The method according to claim 7, wherein the conductivity signal is used for identifying the search object material.

9. The method according to claim 7, wherein from conductivity signals for at least two frequencies is formed a frequency dependence signal representing the frequency dependence of the conductivity of the search object material.

10. The method according to claim 9, wherein the frequency dependence signal is used for identifying the search object material.

11. The method according to claim 1, wherein one of the group of the primary alternating current I1 contains at least one component of a low frequency F0 and the transmitting coil in time-staggered manner to the primary current I1 at least for a time interval is supplied with an alternating current I0 with the low frequency f0, the low frequency f0 being between 10 and 1000 Hz.

12. The method according to claim 11, wherein at least two different low frequencies of type f0 are used and wherein at least one of the group of an imaginary differential signal and a real differential signal of two low frequencies is formed.

13. The method according to claim 11, wherein using a low frequency signal resulting from at least one low frequency a transformation signal is formed and wherein by means of the transformation signal a transformed coil signal is formed, which essentially contains no signal component resulting from an optionally present magnetizability of the search object.

14. The method according to claim 1, wherein the frequencies of the primary current differ from one another by identical integral factors.

15. The method according to claim 14, wherein the integral factor is equal to one of the group of 2 and 4 and 8.

16. The method according to claim 14, wherein the first frequency f1 is between 1.5 and 2.5 kHz, wherein a second frequency is between 12 and 20 kHz and wherein a third frequency is between 96 and 160 kHz.

17. The method according to claim 1, wherein the combination signal is a ground signal UB, the method for a frequency f comprising the following stages:
forming a projected metal signal M, which corresponds to one of a real component and an imaginary component of a metal signal component of the probe signal caused by a metal part,
multiplying the projected metal signal with a factor C specific for the frequency f for forming a weighted, projected metal signal,
subtracting the weighted, projected metal signal from the weighted projection signal associated with the frequency f, the weighted projection signal and the weighted projected metal signal being of the same type (real signal or imaginary signal).

18. The method according to claim 17, wherein the step of forming the projected metal signal comprises the following steps:
forming a conductivity signal (L2/R2) proportional to the electrical conductivity of the metal piece,
forming a coupling signal GI representing the magnetic coupling between the transmitting coil and the search object and between the search object and the receiving coil, which with respect to the imaginary axis and the frequency f1 is formed as follows:

$$GI=DIm/(G*(1/(S+1)-V21^2)/(S+V21^2))$$

with
G=FI1*f1*I11, in which I11 is the amplitude of the primary current of the component of the first frequency f1

$$S=(R2/(f1+L2))^2;$$

$$V21=f2/f1,$$

forming the projected metal signal, which with respect to the imaginary axis and the frequency f1 is formed in the following way:

$$UI1=(GI/FI1)*G(1/(S+1)).$$

19. A device for ground identification and foreign body detection in a search area with at least one eddy current probe having a search coil system, which has at least one transmitting coil connected to an alternating current source, to which can be supplied a primary alternating current with a component of a first frequency f1 and at least one second component f2, and at least one receiving coil, which is electrically connected to a signal evaluating device and which in particular on approaching an electrically conductive search object produces a coil signal U corresponding to an a.c. voltage, wherein the signal evaluating device has the following elements:

frequency splitting means, electrically connected to the at least one receiving coil for splitting the coil signal into frequency components corresponding to the first frequency f1 and the at least one second frequency f2, projection signal forming means electrically connected to the frequency splitting means for forming two projection signals associated with the first frequency f1 and two projection signals associated with the at least one second frequency f2, wherein a projection signal is a real signal UR1 or UR2 or an imaginary signal UI1 or UI2 and represents a real or an imaginary component of a frequency component, amplifying means electrically connected to the projection signal forming means for multiplying the projection signals with factors FR1, FR2, FI1 or FI2 associated with the particular projection signals for forming weighted projection signals, at least two subtractors electrically connected to the amplifying means for forming at least two differential signals DIm or DR, a differential signal representing the difference between two weighted projection signals of the same type (real or imaginary signal) associated with the frequencies f1 or f2, and combination signal forming means electrically connected to the subtractors for forming a combination signal by combining at least two differential signals of type DIm or DR in a manner differing from a simple linear combination, the combination signal representing a processed coil signal.

20. The device according to claim 19, wherein the combination signal forming means have at least one amount forming element electrically connected to an output of a subtractor.

21. The device according to claim 20, wherein each subtractor is followed by an amount forming element.

22. The device according to claim 20, wherein the outputs of at least two amount forming elements are electrically connected to inputs of a summator.

23. The device according to claim 19, wherein the combination signal forming means have at least one dividing element with at least two inputs, whereof one input is connected to the output of a subtractor constructed for forming an imaginary differential signal and one input is connected to the output of a subtractor constructed for forming a real differential signal.

24. The device according to claim 19, wherein the combination signal forming means have at least one computing element with at least one first and at least one second input, the first and second inputs being electrically connected to one of the group of the outputs of two different subtractors for forming an imaginary differential signal and the outputs of two different subtractors for forming a real differential signal.

25. The device according to claim 19, wherein the device is a mine search device.

* * * * *

UNITED STATES PATENT AND TRADEMARK OFFICE
CERTIFICATE OF CORRECTION

PATENT NO. : 6,005,392
DATED : December 21, 1999
INVENTOR(S) : Patzwaldt It is certified that error appears in the above-identified patent and that said Letters Patent is hereby corrected as shown below:

Column 8, line 1, (Eq. 12), at the end insert --...--.

Column 16, line 55, in the equation, "UI1=(GI/FI1)*G(1/(S+1))" should read --UI1=(GI/FI1)*G*(1/(S+1))--.

Signed and Sealed this

Thirty-first Day of October, 2000

Attest:

Q. TODD DICKINSON

*Attesting Officer*          *Director of Patents and Trademarks*